United States Patent
Urabayashi et al.

(10) Patent No.: US 11,832,351 B2
(45) Date of Patent: Nov. 28, 2023

(54) RADIO TERMINAL

(71) Applicant: KYOCERA Corporation, Kyoto (JP)

(72) Inventors: Hiroyuki Urabayashi, Yokohama (JP); Mayumi Komura, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 379 days.

(21) Appl. No.: 16/319,846

(22) PCT Filed: Jul. 19, 2017

(86) PCT No.: PCT/JP2017/026034
§ 371 (c)(1),
(2) Date: Jan. 23, 2019

(87) PCT Pub. No.: WO2018/021100
PCT Pub. Date: Feb. 1, 2018

(65) Prior Publication Data
US 2019/0274187 A1    Sep. 5, 2019

(30) Foreign Application Priority Data

Jul. 26, 2016 (JP) ................................. 2016-146083

(51) Int. Cl.
*H04W 88/02* (2009.01)
*H04W 72/04* (2023.01)
(Continued)

(52) U.S. Cl.
CPC ........... *H04W 88/02* (2013.01); *H04W 16/14* (2013.01); *H04W 72/04* (2013.01);
(Continued)

(58) Field of Classification Search
CPC ..... H04W 88/02; H04W 76/27; H04W 16/14; H04W 72/04; H04W 72/042;
(Continued)

(56) References Cited

U.S. PATENT DOCUMENTS

2012/0307781 A1* 12/2012 Enomoto ............ H04L 1/1861
  370/329
2014/0169328 A1   6/2014 Ahimezawa et al.
(Continued)

FOREIGN PATENT DOCUMENTS

JP   2011-166411 A   8/2011
JP   2016103662 A    6/2016
(Continued)

OTHER PUBLICATIONS

Ericsson, Nokia, New Work Item on Enhancements to LTE operation in unlicensed spectrum, 3GPP TSG RAN Meeting #72, RP-160870, Jun. 13-16, 2016, pp. 1-10, Busan, Korea.
(Continued)

*Primary Examiner* — Bailor C Hsu
(74) *Attorney, Agent, or Firm* — Studebaker & Brackett PC

(57) ABSTRACT

A radio terminal according to one embodiment comprises a controller configured to transmit a physical uplink shared channel to a base station by an interlace mapping using a plurality of resource blocks distributed on a frequency axis while overlapping on a time axis. The controller receives, from the base station, control channel information on a time-frequency resource used for transmitting the physical uplink control channel. The controller stops transmission in a specific resource block corresponding to the time-frequency resource from among the plurality of resource blocks, based on the control channel information.

4 Claims, 8 Drawing Sheets

(51) Int. Cl.
  *H04W 72/14* (2009.01)
  *H04W 16/14* (2009.01)
  *H04W 76/27* (2018.01)
  *H04W 74/08* (2009.01)
  *H04W 72/0446* (2023.01)
  *H04W 72/0453* (2023.01)
  *H04W 72/23* (2023.01)

(52) U.S. Cl.
  CPC ... *H04W 72/0446* (2013.01); *H04W 72/0453* (2013.01); *H04W 72/23* (2023.01); *H04W 74/0808* (2013.01); *H04W 76/27* (2018.02)

(58) Field of Classification Search
  CPC ......... H04W 72/0446; H04W 72/0453; H04W 72/14; H04W 74/0808
  See application file for complete search history.

(56) References Cited

U.S. PATENT DOCUMENTS

| | | | |
|---|---|---|---|
| 2015/0085794 A1* | 3/2015 | Chen | H04W 72/042 370/329 |
| 2015/0358826 A1* | 12/2015 | Wei | H04L 27/0006 370/329 |
| 2016/0036578 A1* | 2/2016 | Malladi | H04L 5/0057 370/329 |
| 2016/0037352 A1* | 2/2016 | Wei | H04W 72/1268 455/454 |
| 2016/0135172 A1* | 5/2016 | Sun | H04W 74/006 370/329 |
| 2016/0174214 A1* | 6/2016 | Yerramalli | H04L 5/0046 370/329 |
| 2016/0337112 A1 | 11/2016 | Suzuki et al. | |
| 2017/0094680 A1* | 3/2017 | Patel | H04W 72/0446 |
| 2017/0150523 A1* | 5/2017 | Patel | H04B 7/26 |
| 2017/0237592 A1* | 8/2017 | Yang | H04W 72/21 375/260 |
| 2017/0273056 A1* | 9/2017 | Papasakellariou | H04W 52/143 |
| 2018/0368172 A1* | 12/2018 | Li | H04L 1/1887 |
| 2019/0110307 A1* | 4/2019 | Kim | H04W 74/0808 |
| 2020/0314815 A1* | 10/2020 | Kim | H04L 1/1864 |
| 2021/0014020 A1* | 1/2021 | Bhattad | H04L 5/0057 |
| 2021/0029731 A1* | 1/2021 | Kundu | H04W 72/02 |
| 2021/0105764 A1* | 4/2021 | Datta | H04L 5/0017 |
| 2022/0295452 A1* | 9/2022 | Tsai | H04W 72/21 |

FOREIGN PATENT DOCUMENTS

| | | |
|---|---|---|
| WO | 2013/018612 A1 | 2/2013 |
| WO | 2015/111325 A1 | 7/2015 |

OTHER PUBLICATIONS

Ericsson, On PUSCH transmission for eLAA, 3GPP TSG RAN Working Group 4 (Radio) Meeting #79, R4-163546, May 23-27, 2016, pp. 1-5, Nanjing, China.

* cited by examiner

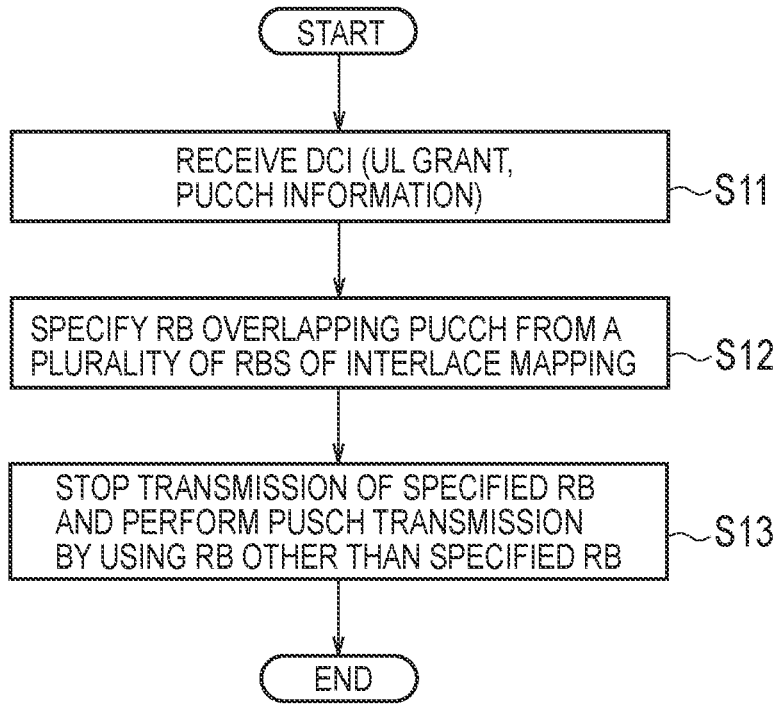
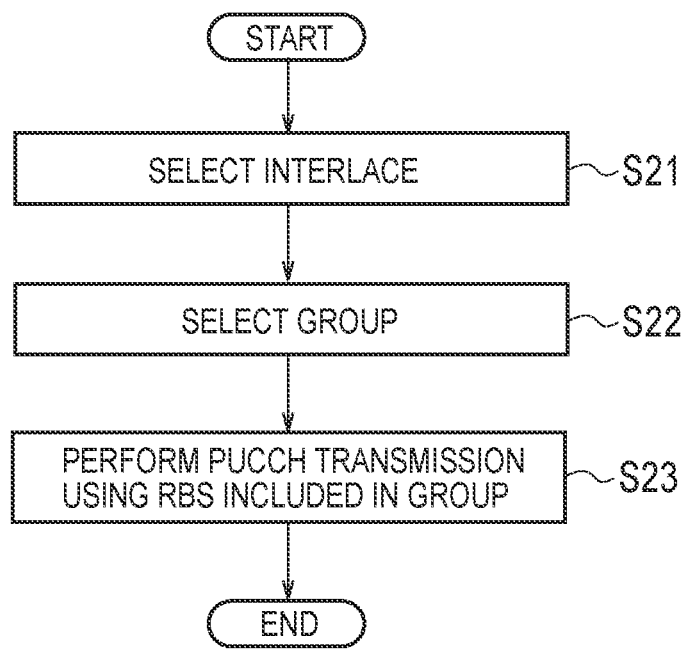

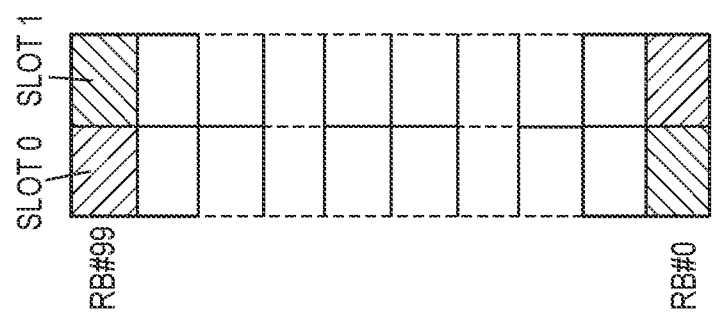
FIG. 10A LEGACY
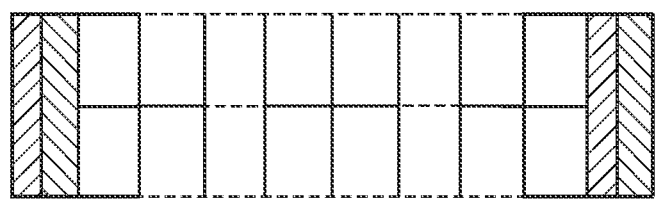
FIG. 10B ALT.1
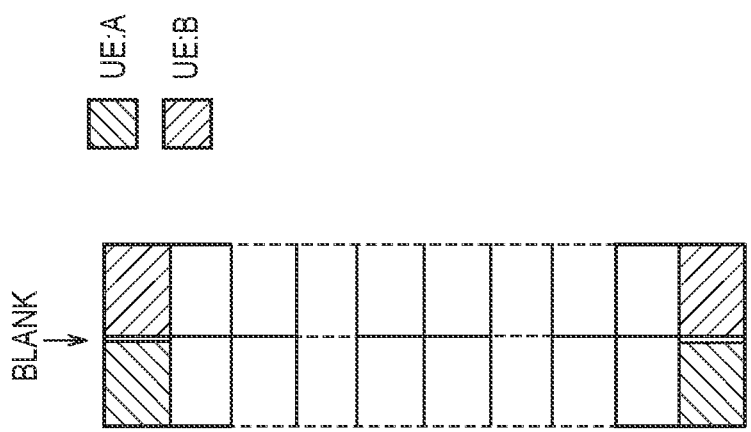
FIG. 10C ALT.2
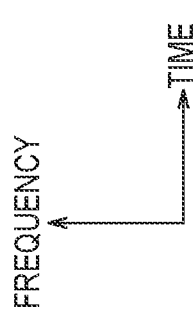

RADIO TERMINAL

TECHNICAL FIELD

The present disclosure relates to a radio terminal used in a mobile communication system.

BACKGROUND ART

In 3GPP (3rd Generation Partnership Project) which is a project aiming to standardize a mobile communication system, LAA (Licensed-Assisted Access) has been standardized. The LAA is a carrier aggregation technology employing at least one secondary cell (SCell) operating in an unlicensed spectrum with the aid of a primary cell (PCell) operating in a licensed spectrum. Such an SCell is referred to as "LAA SCell". In 3GPP Release 13, the LAA SCell is limited to downlink communication.

In eLAA (enhanced LAA) with advanced LAA, it is considered to employ the LAA SCell also for uplink transmission. In addition, it is assumed that interlace mapping is applied to a physical uplink shared channel (PUSCH) transmission in the LAA SCell. The interlace mapping is a resource mapping scheme employing a plurality of resource blocks distributed on a frequency axis while overlapping on a time axis.

In addition, a standalone operation of performing LTE (Long Term Evolution) communication only in the unlicensed spectrum is being considered without using the licensed spectrum. In the LAA, the licensed spectrum is used for physical uplink control channel (PUCCH) transmission, but in the standalone operation, the unlicensed spectrum is used for the PUCCH transmission. Therefore, a technology that enables PUCCH and PUSCH to properly coexist in the unlicensed spectrum is desired.

PRIOR ART DOCUMENT

Non-Patent Document

Non Patent Document 1: 3GPP contribution "RP-160870"

SUMMARY OF THE INVENTION

A radio terminal according to one embodiment comprises a controller configured to transmit a physical uplink shared channel to a base station by an interlace mapping using a plurality of resource blocks distributed on a frequency axis while overlapping on a time axis. The controller receives, from the base station, control channel information on a time-frequency resource used for transmitting the physical uplink control channel. The controller stops transmission in a specific resource block corresponding to the time-frequency resource from among the plurality of resource blocks, based on the control channel information.

A radio terminal according to one embodiment comprises a controller configured to transmit a physical uplink control channel to a base station. The controller is configured to transmit the physical uplink control channel by using a plurality of resource blocks distributed on a frequency axis while overlapping on a time axis.

A radio terminal according to one embodiment comprises a controller configured to transmit uplink control information to a base station. If an LBT is not successful until a transmission timing of the uplink control information, the controller continues the LBT until a predetermined allowed time elapses from the transmission timing. The controller transmits the uplink control information in response to the LBT being successful within the predetermined allowed time.

BRIEF DESCRIPTION OF THE DRAWINGS

FIG. 8 is a diagram illustrating an operation of the UE according to the first embodiment.

FIG. 9 is a diagram illustrating an operation of the UE according to the second embodiment.

FIG. 10 is a diagram illustrating a method of mapping PUCCH according to a third embodiment.

DESCRIPTION OF THE EMBODIMENT

[Mobile Communication System]

Figure 1:
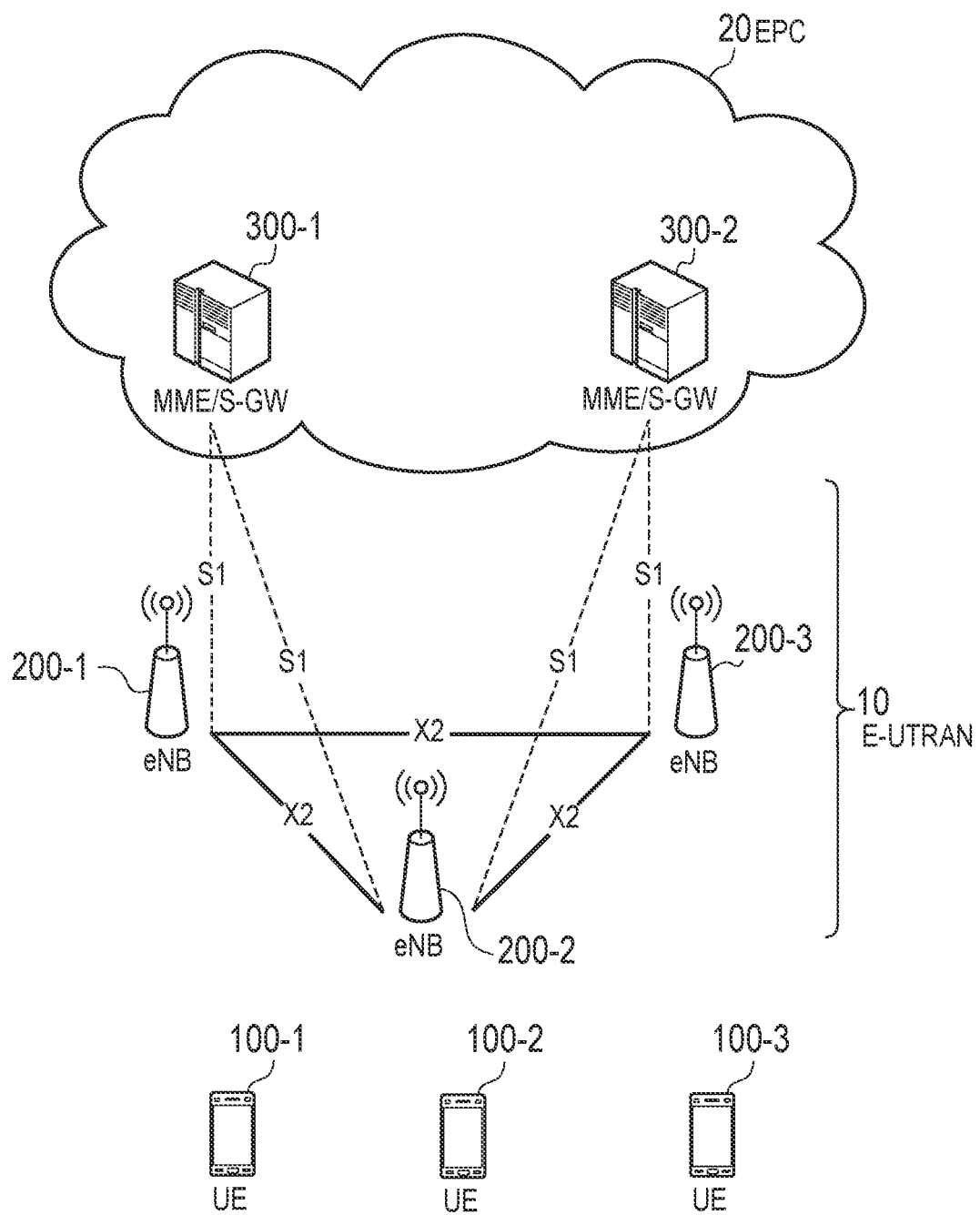
FIG. 1 is a diagram illustrating a configuration of an LTE system according to an embodiment.

The configuration of the mobile communication system according to the embodiment will be described. FIG. 1 is a diagram illustrating a configuration of an LTE system that is a mobile communication system according to the embodiment. The LTE system is a mobile communication system based on the 3GPP standard.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells. The eNB 200 performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. The "cell" is used as a term indicating a minimum unit of a radio communication area. The "cell" is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface.

Figure 2:
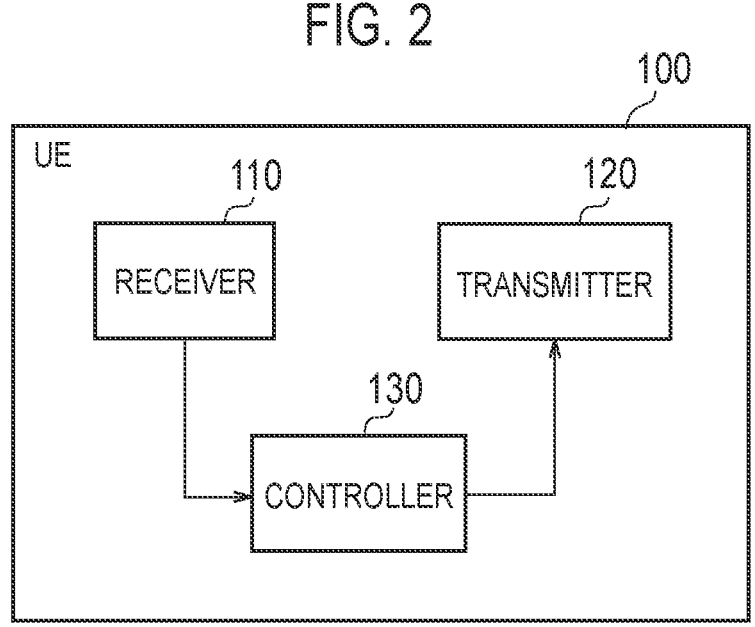
FIG. 2 is a diagram illustrating a configuration of a UE (radio terminal) according to the embodiment.

FIG. 2 is a diagram illustrating a configuration of a UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor a CPU (Central Processing Unit). The baseband processor performs modulation and demodulation, encoding and decoding and the like of a baseband signal. The CPU performs various processes by executing the program stored in the memory. The processor executes below-described processes.

Figure 3:
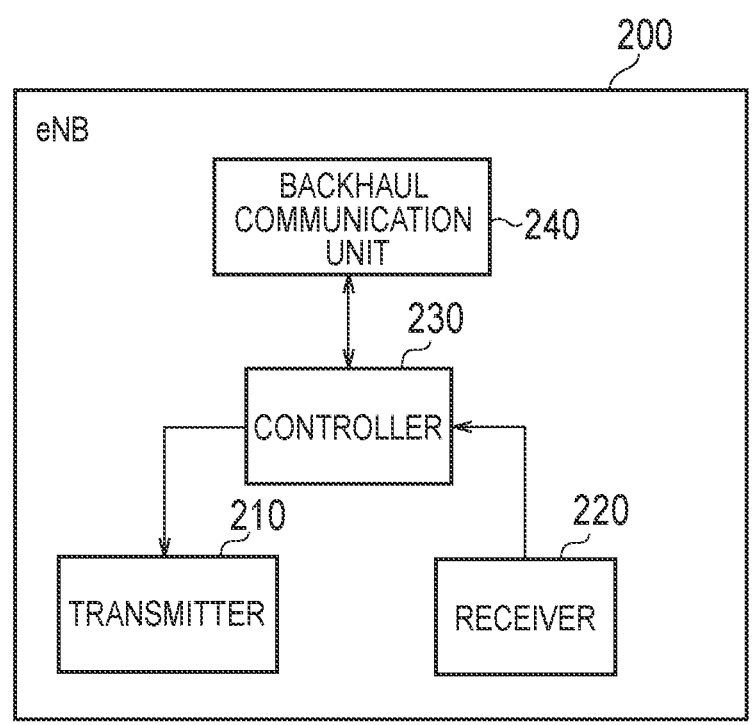
FIG. 3 is a diagram illustrating a configuration of an eNB (base station) according to the embodiment.

FIG. 3 is a diagram illustrating a configuration of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor and a CPU (Central Processing Unit). The baseband processor performs modulation and demodulation, encoding and decoding and the like of a baseband signal. The CPU performs various processes by executing the program stored in the memory. The processor executes the below-described processes.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

Figure 4:
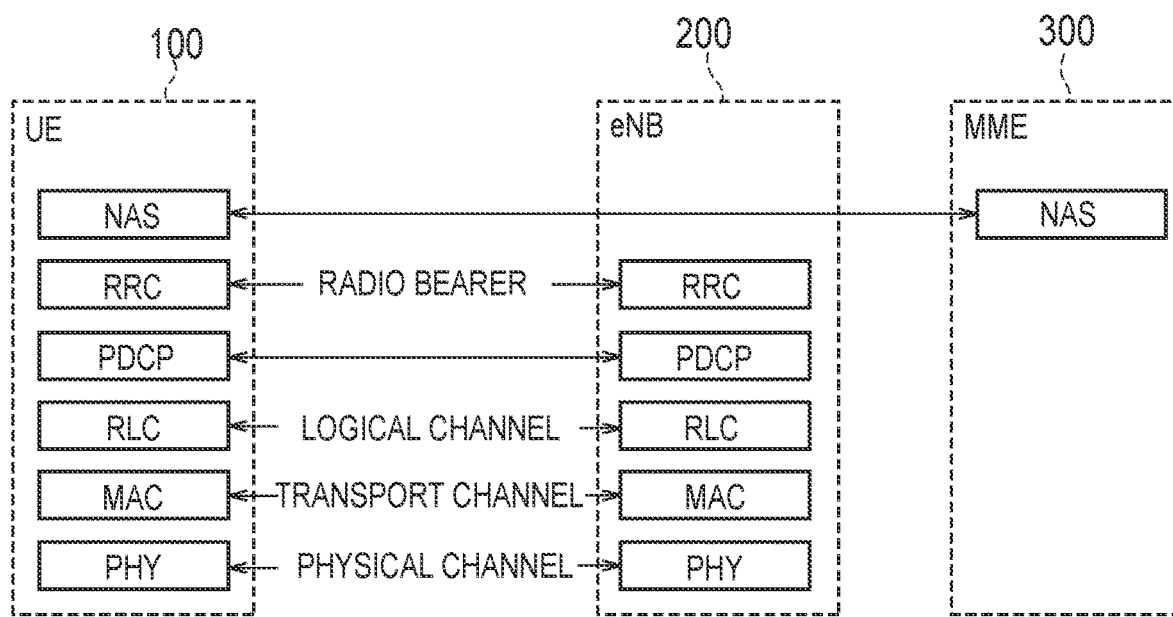
FIG. 4 is a diagram illustrating a configuration of a protocol stack of a radio interface according to the embodiment.

FIG. 4 is a diagram illustrating a configuration of a protocol stack of a radio interface in the LTE system. As illustrated in FIG. 4, the radio interface protocol is classified into a layer 1 to a layer 3 of an OSI reference model. The layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control information are transmitted via a transport channel. The MAC layer of the eNB 200 includes a scheduler. The scheduler determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, message (RRC signaling) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200. The UE 100 is in an RRC connected mode, otherwise the UE 100 is in an RRC idle mode.

A NAS (Non-Access Stratum) layer positioned above the RRC layer performs a session management, a mobility management and the like.

Figure 5:
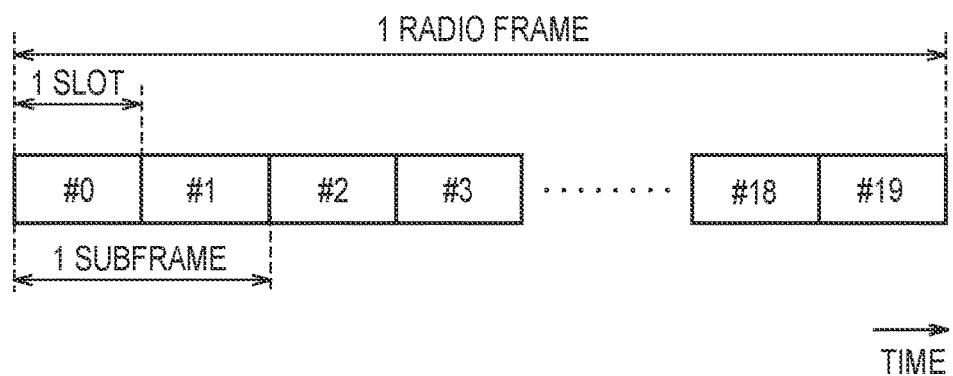
FIG. 5 is a diagram illustrating a configuration of a radio frame according to the embodiment.

FIG. 5 is a diagram illustrating a configuration of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time axis. Each subframe is configured by two slots arranged in the time axis. Each subframe has a length of 1 ms and each slot has a length of 0.5 ms. Each subframe includes a plurality of resource blocks (RBs) in a frequency axis (not shown), and a plurality of symbols in the time axis. Each resource block includes a plurality of subcarriers in the frequency axis. Specifically, one RB is composed of twelve subcarriers and one slot. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a region used as a physical downlink control channel (PDCCH) for mainly transmitting control information. Furthermore, the other portion of each subframe is a region available as a physical downlink shared channel (PDSCH) for mainly transmitting downlink data.

In general, the eNB 200 uses the PDCCH to transmit downlink control information (DCI) to the UE 100, and uses the PDSCH to transmit the downlink data to the UE 100. The DCI carried by the PDCCH includes uplink scheduling information, downlink scheduling information, and a TPC command. The uplink scheduling information is scheduling information (UL grant) on allocation of an uplink radio resource. The downlink scheduling information is scheduling information on allocation of a downlink radio resource. The TPC command is information for instructing an increase or decrease in the uplink transmission power. In order to identify a UE 100 to which the DCI is transmitted, the eNB 200 includes a CRC bit scrambled with an identifier (Radio Network Temporary ID (RNTI)) of the UE 100 to which the DCI is transmitted, into the DCI. Each UE 100 descrambles the DCI possibly destined to each UE with the RNTI of each UE, and then, performs a CRC check. Each UE 100 performs the CRC check to perform blind decoding on the PDCCH to detect the DCI destined to each UE 100. The PDSCH carries the downlink data by the downlink radio resource (resource block) indicated by the downlink scheduling information.

In the uplink, both ends in the frequency axis of each subframe are regions used as a physical uplink control channel (PUCCH) for mainly transmitting the uplink control information. The remaining portion of each subframe is a region that can be used as a physical uplink shared channel (PUSCH) for mainly transmitting uplink data.

Basically, the UE 100 uses the PUCCH to transmit uplink control information (UCI) to the eNB 200, and uses the PUSCH to transmit the uplink data to the eNB 200. The UCI carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating a downlink channel quality and is used for deciding an MCS to be used for the downlink transmission, for example. The PMI is an index indicating a precoder matrix desirably used for the downlink transmission. The RI is an index indicating the number of layers (the number of streams) that can be used for the downlink transmission. The SR is information for requesting an allocation of a PUSCH resource. The HARQ ACK/NACK is delivery acknowledgement information indicating whether or not downlink data is correctly received.

[Standalone Operation]

The standalone operation according to the embodiment will be described. In the standalone operation, LTE communication is performed by using an unlicensed spectrum only without using a licensed spectrum.

The unlicensed spectrum is a frequency band shared among a plurality of communication systems and/or a plurality of operators, and thus, LBT (Listen-Before-Talk) is obligatory. Specifically, a device using the unlicensed spectrum monitors/senses a channel on the LAA cell to determine whether the channel is free or busy. The device, upon determining that the channel is free (that is, if LBT is successful), performs transmission, and otherwise, does not perform the transmission. If LBT is successful, the device is allowed to occupy the channel for a predetermined duration.

In such a scenario, in the unlicensed spectrum, the UE 100 transmits a PUCCH transmission and a PUSCH transmission to the eNB 200. In the embodiment, it is assumed that interlace mapping is applied to the PUSCH transmission. The interlace mapping is a resource mapping scheme employing a plurality of resource blocks distributed on a frequency axis while overlapping on a time axis. In the unlicensed spectrum, it is required to perform transmission by using a certain bandwidth or more (for example, 80% or more of the system bandwidth), but in the interlace mapping, a plurality of UEs 100 can be multiplexed by frequency division multiplexing (FDM) while satisfying such a request.

Figure 6:
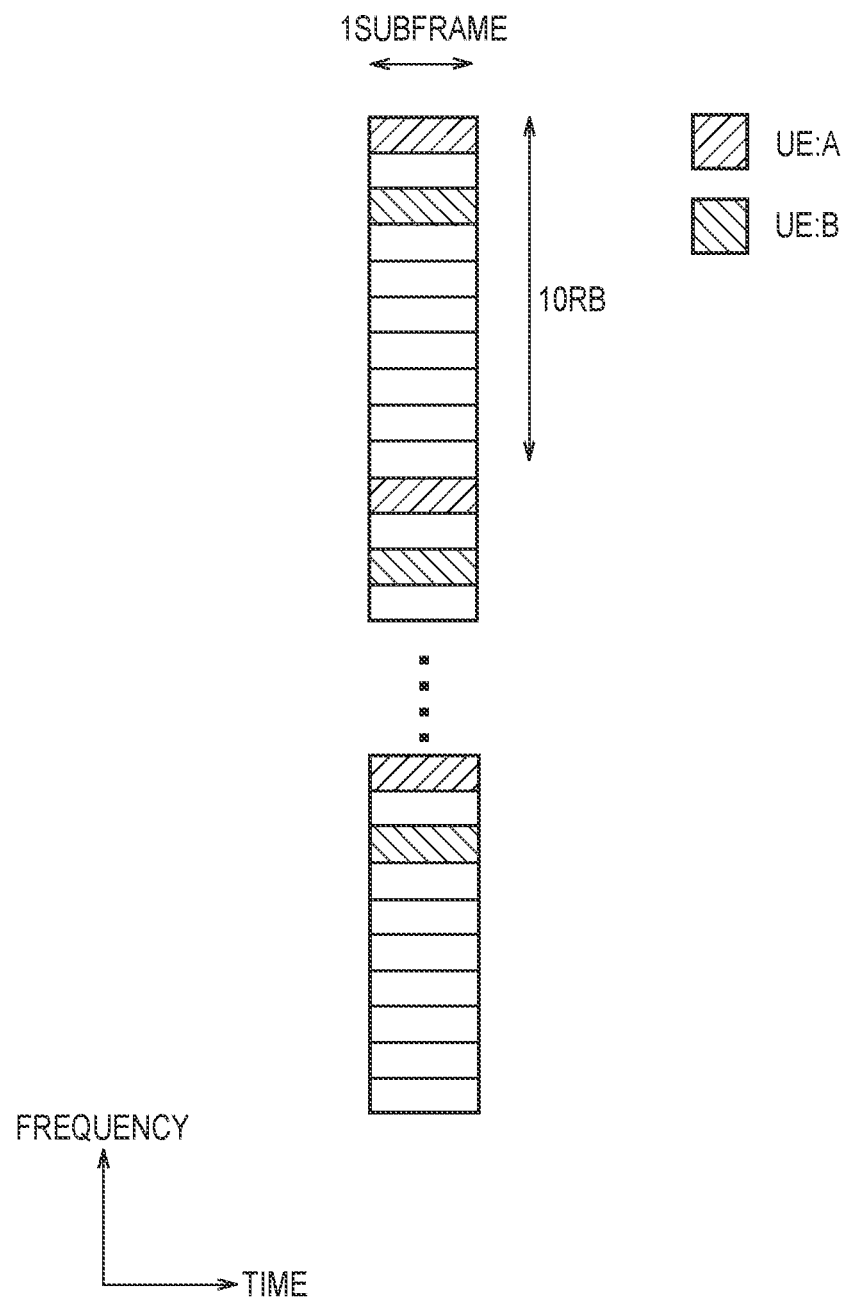
FIG. 6 is a diagram illustrating interlace mapping according to the embodiment.

FIG. 6 is a diagram illustrating the interlace mapping according to the embodiment. As illustrated in FIG. 6, each UE 100 performs a PUSCH transmission by using a predetermined number of resource blocks arranged with a predetermined frequency interval. For example, each UE 100 performs a PUSCH transmission by using 10 RBs arranged with a frequency interval of 10 RBs.

The interlace mapping has a plurality of patterns as arrangement patterns of a plurality of RB distributed on the frequency axis while overlapping on the time axis. Such a pattern is referred to as "interlace", below. If a frequency interval of 10 RBs is provided, an interlace #0 is comprised of RB #0, RB #10, RB #20, . . . . An interlace #1 is comprised of RB #1, RB #11, RB #21, . . . . An interlace #2 is comprised of RB #2, RB #12, RB #22, . . . . In this way, a total of 10 interlaces of interlaces #0 to #9 are defined. Therefore, 10 UEs can be multiplexed by the FDM. However, a plurality of interlaces may be allocated to one UE 100.

First Embodiment

A first embodiment will be described.

Figure 7:
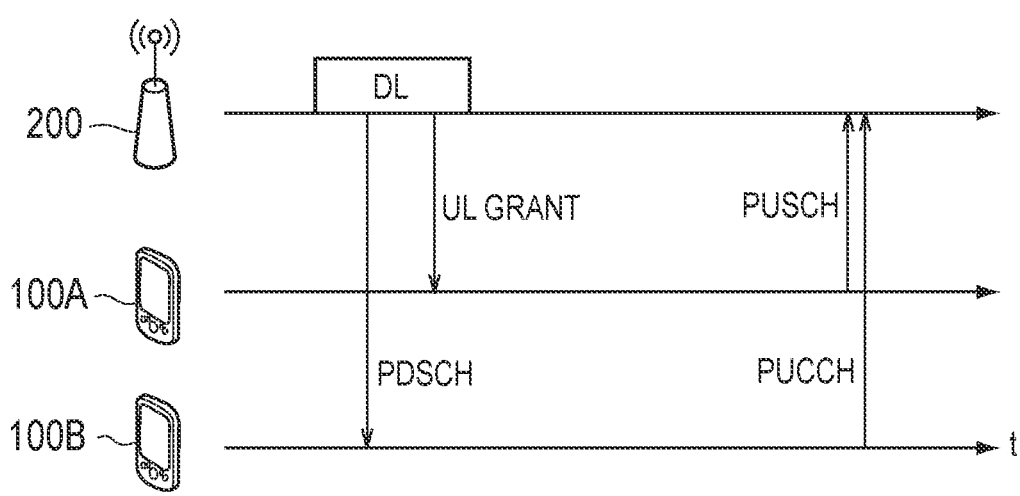
FIG. 7 is a diagram illustrating an assumed scenario according to first and second embodiments.

FIG. 7 is a diagram illustrating an assumed scenario according to the first embodiment. As illustrated in FIG. 7, a UE 100A and a UE 100B perform LTE communication with the eNB 200, based on the standalone operation.

The UE 100A receives DCI including an uplink grant (UL grant) from the eNB 200. The UE 100A transmits PUSCH to the eNB 200 in response to reception of the UL grant. The interlace mapping described above is applied to the transmission of the PUSCH. It is noted that a timing of the PUSCH transmission of the UE 100A may be designated in the DCI.

The UE 100B receives PDSCH from the eNB 200. The UE 100B transmits PUCCH to the eNB 200 in response to reception of the PDSCH. Specifically, the UE 100B receives downlink data by the PDSCH, and transmits UCI including HARQ ACK/NACK corresponding to the received downlink data by the PUCCH. As an example, the PUCCH is arranged at both ends of the system band on the frequency axis. It is noted that a timing of the PUCCH transmission of the UE 100A or a candidate position thereof may be designated from the eNB 200.

Here, if the PUSCH transmission of the UE 100A and the PUCCH transmission of the UE 100B occur in the same subframe, the RB used for the PUSCH transmission and the RB used for the PUCCH transmission may overlap. In the existing interlace mapping of the PUSCH, collision (interference) can occur between the PUSCH and the PUCCH because the existence of PUCCH is not taken into consideration.

Therefore, in the first embodiment, the eNB 200 transmits to the UE 100A control channel information (hereinafter, referred to as "PUCCH information") on a time-frequency resource used for transmitting the PUCCH. Specifically, upon transmitting the DCI including the UL grant to the UE 100A, the eNB 200 includes the PUCCH information into the DCI. The PUCCH information includes at least one of subframe information, band information, and application time.

The subframe information is information (for example, a subframe number) indicating a subframe used, by the UE 100B, for transmitting the PUCCH.

The band information is information (for example, an RB number, an RB range, etc.) indicating the RB used, by the UE 100B, for transmitting the PUCCH. Alternatively, if the PUCCH region that is a range of the RB used for transmitting the PUCCH is previously defined, the band information may be a 1-bit flag. Alternatively, the band information may be a bitmap indicating the RB used, by the UE 100B, for transmitting the PUCCH. For example, the bitmap is comprised of a bit string indicating the RB used for transmitting the PUCCH with "1" and the RB not used for transmitting the PUCCH with "0".

The application time indicates a time length (for example, the number of subframes) to which the PUCCH information is applied. The UE 100A stops transmission in the RB indicated by the band information or a previously defined PUCCH region, within the time indicated by the application time.

The UE 100A receives the DCI including the UL grant and the PUCCH information from the eNB 200. Based on the PUCCH information, the UE 100A stops the transmission in the RB indicated by the band information or the previously defined PUCCH region from among a plurality of RBs included in the interlace allocated to the UE 100A. It is noted that stopping the transmission may mean that data is not arranged in the corresponding RB or that the transmission power of the corresponding RB is set to zero.

If the PUCCH information includes the subframe information, the UE 100A stops transmission in the RB indicated by the band information or the previously defined PUCCH region, in the subframe indicated by the subframe information. Further, if the PUCCH information includes the band information, the UE 100A stops transmission in the RB indicated by the band information. In addition, if the PUCCH information includes the application time, the UE 100A stops transmission in the RB indicated by the band information or the previously defined PUCCH region, within the time indicated by the application time. After the time indicated by the application time has elapsed, the UE 100A can resume transmission in the RB indicated by the band information or the previously defined PUCCH region.

It is noted that that the UE 100B configured to perform the PUCCH transmission need not particularly pay attention to the PUSCH transmission of UE 100A.

FIG. 8 is a diagram illustrating an operation of the UE 100A according to the first embodiment. As illustrated in FIG. 8, in step S11, the UE 100A receives the DCI including the UL grant and the PUCCH information, from the eNB 200.

In step S12, based on the PUCCH information, the UE 100A specifies an RB overlapping with the PUCCH from among the plurality of RBs included in the interlace allocated to the UE 100A. For example, if the interlace #0 (RB #0, RB #10, RB #20, . . . ) is allocated to the UE 100A and the RB #0 is indicated as the RB used for the PUCCH transmission, the UE 100A specifies the RB #0 as the RB overlapping with the PUCCH.

In step S13, the UE 100A performs the PUSCH transmission by using an RB other than the specified RB while stopping the transmission with the specified RB.

First Modification of First Embodiment

In the first embodiment described above, the UE 100A receives from the eNB 200 the PUCCH information indicating time-frequency resources used by another UE for transmitting PUCCH. Based on the received PUCCH information, the UE 100A stops the transmission of the RB overlapping with the PUCCH from among the plurality of RBs included in the interlace allocated to the UE 100A. Such PUCCH information can be regarded as information indicating the time-frequency resource prohibited from being used by the UE 100A for the PUSCH transmission. Further, in the above-described first embodiment, the "RB used for transmission of PUCCH" may be replaced with an "RB prohibited from being used for PUSCH transmission", and the "PUCCH region" can be replaced with a "PUSCH transmission prohibited region".

Second Modification of First Embodiment

In the above-described first embodiment, a method of allocating, by the eNB 200, the interlace (plurality of RBs) to the UE 100A is not particularly mentioned.

The Interlace allocation is performed in the DCI (PDCCH). In the DCI, the eNB 200 notifies the UE 100A of interlace allocation information indicating the interlace. In the above-described first embodiment, the interlace allocation information is information for allocating an RB on an interlace basis. For example, the interlace allocation information may be an identifier indicating the interlace or a value indirectly specifying the interlace. In this case, the UE 100A specifies an RB to be allocated, based on the interlace allocation information and a previously defined calculation formula or table.

Alternatively, the interlace allocation information may be a bitmap for performing allocation on an RB basis. In the bitmap, a position of each bit corresponds to a position of an RB. For example, each bit in the bitmap indicates an RB to be allocated as "1" and an RB not to be allocated as "0". When such an allocation method is employed, the eNB 200 may perform scheduling so that another UE does not allocate an RB used for transmitting the PUCCH, to the UE 100A, and may notify the UE 100A of the bitmap.

Third Modification of First Embodiment

In the above-described first embodiment, an example where the PUCCH information is transmitted by the DCI is described. However, the PUCCH information may be transmitted by an RRC signaling. The RRC signaling may be a broadcast RRC signaling or a terminal-specific RRC signaling. The broadcast RRC signaling may be SIB (System Information Block). The terminal-specific RRC signaling may be an RRC Connection Reconfiguration message. Information transmitted by the RRC signaling may include information on the PUCCH region or range of the RB used for transmitting the PUCCH. The PUCCH information transmitted by the RRC signaling may include information on a candidate subframe used for transmitting the PUCCH.

Upon receiving the PUCCH information transmitted by the eNB 200 by the RRC signaling, the UE 100A stores the received PUCCH information. Thereafter, upon performing the PUSCH transmission, the UE 100A specifies the RB overlapping the PUCCH, based on the stored PUCCH information. Then, while stopping the transmission of the specified RB, the UE 100A performs the PUSCH transmission by using an RB other than the specified RB.

Second Embodiment

A second embodiment will be described with a focus on a difference from the first embodiment. In the second embodiment, a scenario similar to that in the first embodiment (see FIG. 7) will be assumed.

In the first embodiment, it is assumed that the PUCCH is transmitted at the both ends (both ends on the frequency axis) of the system band as in the conventional case. On the other hand, in the second embodiment, one of the interlaces of the PUSCH is used as an interlace for PUCCH so that the PUSCH and the PUCCH can coexist. Since the interlace mapping of the PUSCH serves as a basis for the coexistence, the second embodiment can be realized without affecting the PUSCH.

As described above, the interlace mapping has a plurality of interlaces as an arrangement pattern of RBs distributed on the frequency axis while overlapping on the time axis. The UE 100B configured to transmit the PUCCH to the eNB 200 (see FIG. 7) performs the PUCCH transmission by using one interlace selected from among the plurality of interlaces. That is, the UE 100B transmits the PUCCH by the interlace mapping. The interlace used for transmitting the PUCCH may be notified to the UE 100B by the eNB 200, for example, by the RRC signaling (UE-specific RRC signaling) or the DCI. In this case, an identifier (or an index) of the interlace may be specified, or the interlace may be specified indirectly.

However, if the PUSCH interlace is applied to the PUCCH transmission as is, too many resource blocks may be allocated to the PUCCH transmission. Specifically, it may be useless to allocate all the RBs (for example, 10 RBs) included in one interlace to the PUCCH transmission inspite the conventional PUCCH transmission requirings only one RB. For this reason, RBs included in one interlace are grouped and allocated to the PUCCH transmission on a group basis.

In the second embodiment, the interlace used for transmitting the PUCCH has a plurality of groups with different RBs used for transmitting the PUCCH. For example, the plurality of groups are defined as group #1 {RB #9, 29, 49, 69, 89}, group #2 {RB #19, 39, 59, 79, 99}, and so on. Here, each group is set to secure a constant bandwidth or more (for example, 80% or more of the system bandwidth). The UE 100B transmits the PUCCH by using one group selected from among the plurality of groups.

The information on the RBs included in each group may be notified, by the eNB 200, to the UE 100B, for example, by the RRC signaling or the DCI. For example, the UE 100 notifies information such as the group #1 {RB #9, 29, 49, 69, 89} and the group #2 {RB #19, 39, 59, 79, 99} by broadcast RRC signaling.

The eNB 200 may allocate one group out of a plurality of groups to the UE 100B and notify the UE 100B of the allocated group. Such a notification is performed, for example, by the terminal-specific RRC signaling or the DCI. At that time, the eNB 200 may notify the UE 100 of the information on the RBs included in the allocated group.

Alternatively, the UE 100 may autonomously determine one of the plurality of groups. For example, the UE 100 may determine one group by using an identifier (such as RNTI and IMSI) owned by the UE 100 and a predetermined calculation formula.

FIG. 9 is a diagram illustrating an operation of the UE 100B according to the second embodiment. As illustrated in FIG. 9, in step S21, the UE 100B determines an interlace to be used for transmitting the PUCCH, based on, for example, a notification from the eNB 200.

In step S22, the UE 100B determines the group to be used for transmitting the PUCCH. The determination of the group is based on the notification from the eNB 200 or the autonomous selection of the UE 100B.

In step S23, the UE 100B performs the PUCCH transmission by using the RB included in the determined group.

Third Embodiment

A third embodiment will be described with a focus on a difference from the first and second embodiments.

In the above-described first embodiment, it is assumed that the transmission of the PUCCH is performed in the same way as in the conventional technique. However, in the conventional PUCCH transmission, a frequency hopping is performed between slots, and only one RB is used for the PUCCH transmission in one slot. For this reason, it is not possible to satisfy a condition that the transmission is performed by using a constant bandwidth.

On the other hand, in the second embodiment described above, since the interlace mapping is applied to the PUCCH, such a condition can be satisfied.

In a third embodiment, a method of transmitting the PUCCH that can satisfy such a condition by using a method different from that of the second embodiment, will be described. FIG. 10 is a diagram illustrating a method of transmitting the PUCCH. As illustrated in FIG. 10(a), in the conventional method (Legacy), frequency hopping is performed between slots within one subframe. Specifically, a UE:A performs the PUCCH transmission in RB #0 of slot 0, and then, performs the PUCCH transmission in RB #99 in slot 1. A UE:B performs the PUCCH transmission in the RB #99 in the slot 0, and then, performs the PUCCH transmission in the RB #0 in the slot 1. In this manner, in the conventional PUCCH transmission method, each UE uses only one RB on the time axis.

On the other hand, in a PUCCH transmission method illustrated in FIG. 10(b) and FIG. 10(c), an inter-slot hopping is not performed. Specifically, within one slot, the PUCCH transmission is performed by using a pair of RBs located at the both ends of the system bandwidth. This makes it possible to satisfy the condition that the transmission is performed by using a constant bandwidth.

In the method (Alt. 1) illustrated in FIG. 10(b), each of the RBs #0 and #99 is divided on the frequency axis into two, and in the slot 0 and the slot 1, the RBs #0 and #99 are allocated to the both UE:A and UE:B.

In a method (Alt. 2) illustrated in FIG. 10(b), both the RBs #0 and #99 in the slot 0 are allocated to the UE:A, and both the RBs #0 and #99 in the slot 1 are allocated to the UE:B. It is noted that in the method (Alt. 2) illustrated in FIG. 10(b), a non-transmission period (blank period) for the LBT may be provided in a last part of the slot 0 or an initial part of the slot 1. The UE 100B performs the LBT in the non-transmission period, and when the LBT is successful, performs the PUCCH transmission in the slot 1.

The UE 100 may select either the conventional method or the method according to the third embodiment to transmit the PUCCH by the selected method. Such a selection may be based on an instruction or a notification from the eNB 200, or may be based on an autonomous determination of the UE 100. For example, in the unlicensed spectrum, the UE 100 may select the PUCCH transmission method according to the third embodiment and in the licensed spectrum, select the conventional method.

Fourth Embodiment

A fourth embodiment will be described with a focus on a difference from the first embodiment to the third embodiment.

Figure 11:
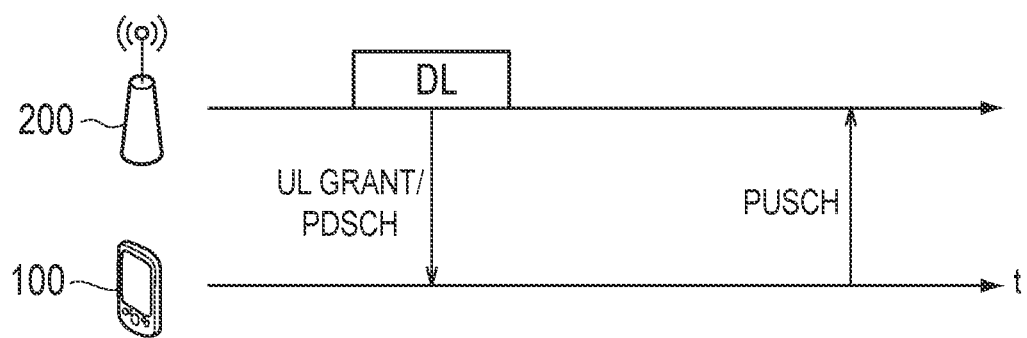
FIG. 11 is a diagram illustrating an assumed scenario according to a fourth embodiment.

FIG. 11 is a diagram illustrating an assumed scenario according to the fourth embodiment. As illustrated in FIG. 11, the UE 100 performs the LTE communication with the eNB 200, based on the standalone operation.

The UE 100 receives the DCI including the UL grant, from the eNB 200. Further, the UE 100 receives downlink data (PDSCH) from the eNB 200. In response to reception of the UL grant, the UE 100 transmits the uplink data to the eNB 200 through the PUSCH. The interlace mapping is applied to the transmission of the PUSCH. Further, the UE 100 transmits the UCI including HARQ ACK/NACK corresponding to the downlink data, to the eNB 200 through the PUSCH. In this way, when the transmission timing of the UCI and the transmission timing of the PUSCH are the same, the UE 100 transmits the UCI, together with the uplink data, through the PUSCH. In the example of FIG. 11, the transmission timing of the UCI and the transmission timing of the PUSCH are the same. In a case of the interlace mapping, a rule for determining the RB, out of one interlace (10 RBs) for the PUSCH, used for the transmission of the UCI may be determined. For example, the UE 100 sets a predetermined 1, 2 RBs, out of one interlace (10 RBs) for the PUSCH, as the RB for the UCI.

However, since the LBT is essential in the unlicensed spectrum, there is a possibility that the UE 100 cannot perform the transmission at a prescribed transmission timing. The prescribed transmission timing may be a PUCCH transmission timing designated from the eNB 200 or a candidate position thereof. In the fourth embodiment, when the LBT is not successful until the prescribed transmission timing, the UE 100 performs the following operation.

When the LBT is successful after the prescribed transmission timing, the UE 100 transmits the UCI, together with the uplink data, to the eNB 200 through the PUSCH in a subframe immediately after the LBT is successful. An allowed time allowing such a delayed transmission may be set. The allowed time may be set by the eNB 200 to the UE 100 by, for example, the RRC signaling or the DCI. Alternatively, the allowed time may be previously set to the UE 100. For example, the allowed time is set on a subframe basis. When the LBT is not successful until the transmission timing of the UCI (prescribed transmission timing), the UE 100 continues the LBT from the transmission timing until the allowed time elapses. The UE 100 transmits the UCI in response to the LBT being successful within the allowed time. When the PUSCH is not scheduled within the allowed time, the UE 100 may perform the transmission by using the PUCCH (UCI) only. Upon lapse of the allowed time, the UE 100 is prohibited from transmitting the UCI (and the uplink data) corresponding to the prescribed transmission timing.

By introducing such an allowed time, it is possible to reduce a processing load of the eNB 200 and to increase a retransmission speed. In the unlicensed spectrum, there is a possibility that the transmission timing will be delayed greatly depending on the LBT. When there is the allowed time, the eNB 200 may perform monitoring during that time only. On the other hand, when there is no allowed time, the eNB 200 needs to continue monitoring until the transmission of the UE 100 occurs, so the load of the eNB 200 increases.

Further, if the UE 100 fails to downlink reception, even a process of transmitting the UCI (ACK/NACK) is not started, so even if the eNB 200 is waiting for the reception, the UCI is not transmitted. Therefore, it is necessary to set a constant period of time (allowed time) to ensure that the eNB 200 starts a retransmission process. In other words, if the UCI is not received from the UE 100 within the allowed time, which is considered by the eNB 200 as an implicit NACK, so the eNB 200 performs the retransmission to the UE 100.

It is noted that the UE 100 may employ a timer corresponding to the allowed time. The timer may be set, by the eNB 200, to the UE 100 by RRC signaling. The UE 100 may start the timer at the prescribed transmission timing and stop the timer when the UCI transmission is successful. The UE 100 may attempt to transmit the UCI while the timer is running and may cancel the transmission of the UCI if the timer expires.

In the fourth embodiment, an example in which the UE 100 transmits the UCI and the uplink data is described; however, the UE 100 may transmit the UCI only without transmitting the uplink data.

Other Embodiments

In the embodiments described above, the standalone operation where the LTE communication is performed only with the unlicensed spectrum is mainly described. However, the operation according to the embodiments described above may be applied to the LTE communication in the licensed spectrum. Alternatively, the operation according to the embodiments described above may be applied to the LTE communication in the LAA (specifically, LAA SCell). Alternatively, the operation according to the embodiments described above may be applied to a normal carrier aggregation that is not the LAA.

Further, in the embodiments described above, the operation in which the UE 100 performs the LTE communication with one eNB 200 is mainly described. However, the operation according to the embodiments described above may be applied to a dual connectivity. In the dual connectivity, the UE 100 performs simultaneous communication with two eNBs (a master eNB and a secondary eNB).

In the embodiments described above, the LTE system is exemplified as the mobile communication system. However, the present invention is not limited to the LTE system. The present invention may be applied to a communication system other than the LTE system.

Cross Reference

The present application claims priority of Japanese Patent Application No. 2016-146083 (filed on Jul. 26, 2016), and the entire content thereof is incorporated herein.

The invention claimed is:

1. A user equipment comprising:
a processor and a memory coupled to the processor, the processor configured to
receive a dedicated signaling including interlace related information, from a base station,
transmit an interlaced physical uplink control channel (PUCCH) based on the interlace related information, and
transmit an interlaced physical uplink shared channel (PUSCH) based on the interlace related information, wherein
resource blocks used for the interlaced PUCCH transmission are arranged with a predetermined frequency interval, and
the processor is further configured to:
receive, from the base station, first information and second information via a dedicated radio resource control (RRC) signaling, the first information indicating a resource block set allocated for PUCCH transmission, the second information indicating an interlace index, in response to receiving the interlace related information, determine first resource blocks comprising an interlace based on the interlace index and select, as second resource blocks, certain resource blocks included in both the first resource blocks and the resource block set, and transmit the interlaced PUCCH transmission using the second resource blocks.

2. The user equipment according to claim 1, wherein the second resource blocks include a pair of resource blocks located at both ends of a system bandwidth within one slot.

3. A method comprising;

receiving, by a user equipment, a dedicated signaling including interlace related information from a base station;

transmitting, by the user equipment, an interlaced physical uplink control channel (PUCCH) based on the interlace related information; and transmitting, by the user equipment, an interlaced physical uplink shared channel (PUSCH) based on the interlace related information, wherein resource blocks used for the interlaced PUCCH transmission are arranged with a predetermined frequency interval, and the method further comprises receiving, by the user equipment, from the base station, first information and second information via a dedicated radio resource control (RRC) signaling, the first information indicating a resource block set allocated for PUCCH transmission, the second information indicating an interlace index;

in response to receiving the interlace related information, determining first resource blocks comprising an interlace based on the interlace index and selecting, as second resource blocks, certain resource blocks included in both the first resource blocks and the resource block set; and transmitting the interlaced PUCCH transmission using the second resource blocks.

4. An apparatus for controlling a user equipment, the apparatus comprising a processor and a memory, the processor configured to:

receive a dedicated signaling including interlace related information, from a base station, transmit an interlaced physical uplink control channel (PUCCH) based on the interlace related information, and transmit an interlaced physical uplink shared channel (PUSCH) based on the interlace related information, wherein resource blocks used for the interlaced PUCCH transmission are arranged with a predetermined frequency interval, and the controller processor is further configured to:

receive, from the base station, first information and second information via a dedicated radio resource control (RRC) signaling, the first information indicating a resource block set allocated for PUCCH transmission, the second information indicating an interlace index, in response to receiving the interlace related information, determine first resource blocks comprising an interlace based on the interlace index and select, as second resource blocks, certain resource blocks included in both the first resource blocks and the resource block set; and transmit the interlaced PUCCH transmission using the second resource blocks.

* * * * *